No. 745,934. PATENTED DEC. 1, 1903.
C. W. VALENTINE.
AIR BRAKE.
APPLICATION FILED MAY 21, 1903.
NO MODEL.
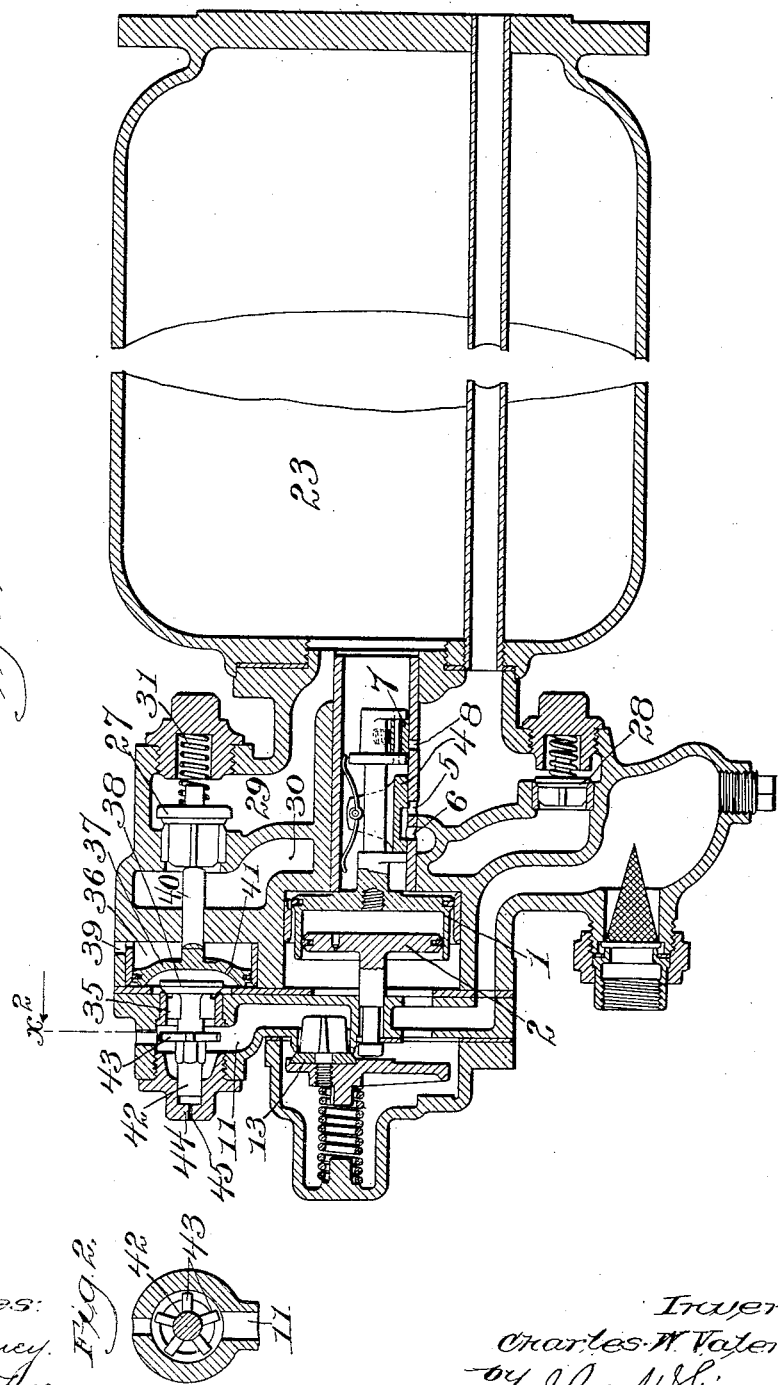
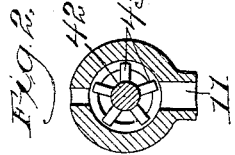
Witnesses:
Inventor.
Charles W. Valentine No. 745,934. Patented December 1, 1903.

UNITED STATES PATENT OFFICE.

CHARLES W. VALENTINE, OF WATERTOWN, NEW YORK, ASSIGNOR TO NEW YORK AIR BRAKE COMPANY, A CORPORATION OF NEW JERSEY.

AIR-BRAKE.

SPECIFICATION forming part of Letters Patent No. 745,934, dated December 1, 1903.

Application filed May 21, 1903. Serial No. 158,122. (No model.)

*To all whom it may concern:*

Be it known that I, CHARLES W. VALENTINE, of Watertown, county of Jefferson, and State of New York, have invented an Improvement in Air-Brakes, of which the following description, in connection with the accompanying drawings, is a specification, like numerals on the drawings representing like parts.

This invention relates to an air-brake apparatus, and has for its object the attainment of quicker individual application of the brakes than is produced by the apparatus in general use.

The present invention relates especially to the triple-valve structure; and it consists in the provision of means for effecting a prompt equalization of pressure in the brake-cylinder and auxiliary reservoir in making an emergency application of the brakes.

In what is commonly known as the "quick-action" air-brake apparatus the quick serial action of the brakes on the several cars of the train is effected by the opening of local vents from the train-pipe at each triple valve, and in the type of quick-action apparatus in which the train-pipe air is vented into the brake-cylinder, as it has been commonly constructed and used, the flow of air from the auxiliary reservoir into the brake-cylinder in making an emergency application of the brakes is relatively retarded, so that although the brakes are applied serially with great rapidity on the several cars of the train each brake is individually slow in acquiring the full or maximum braking force.

The present invention is shown as embodied in a valve of the construction shown in patent to A. P. Massey, No. 537,057, in which the air is locally vented from the train-pipe into the atmosphere for the purpose of hastening the serial application of the brakes in case of emergency, and as applied to that structure the invention consists in novel appliances for controlling the emergency passage from the auxiliary reservoir to the brake-cylinder whereby the maximum braking force is attained in a very short interval of time in making an emergency application of the brakes.

This construction is specially desirable and efficient in connection with trains running at very high speeds, where it is of the utmost importance that the brakes should be applied with maximum force in the shortest interval of time, as the higher the speed the greater the braking force is required for effective checking of the train. When the brakes are individually slow in operation, the train will have run some considerable distance before the maximum braking force is attained.

Figure 1 is a longitudinal vertical section of a triple-valve air-brake apparatus embodying this invention, the parts being shown arranged with the emergency-valve mechanism in the same vertical plane with the triple-valve mechanism, although in practical construction this arrangement or relative location of the parts may be and commonly is different from that shown in the drawings; and Fig. 2 is a detail shown in section in line $x^2$, Fig. 1.

The triple valve proper, actuated by the piston 1 and comprising the exhaust-valve 4 for connecting the passage 5 from the brake-cylinder with the passage 6 to the atmosphere, and the valve 7 for controlling the flow of air from the auxiliary reservoir 23 through the passage 8 into the brake-cylinder are shown as of the same construction as in the Massey patent, No. 537,057, the specific construction of these parts of the apparatus constituting no part of the present invention and it being unnecessary to describe their mode of operation, as it is well known to those acquainted with this art and is set forth in the said Massey patent. The means for operating the train-pipe vent-valve 13 by the piston 2, contained in the triple-valve piston 1, are also shown the same as in the said Massey patent. The said train-pipe vent-valve 13 is opened in response to a sudden fall in train-pipe pressure, as explained in said Massey patent, and the air is permitted to escape from the train-pipe past the valve 13 through the passage 11 to the atmosphere, as explained in said Massey patent.

In accordance with the present invention there is a passage 35 connecting the train-pipe vent-passage 11 with a cylindrical chamber 36, containing a piston 37, said passage 35 being controlled by a check-valve 38, which unseats or opens toward the chamber 36. Thus when the train-pipe air is escaping to the vent-passage in the operation of making an emergency application of the brakes the pressure of said escaping air unseats the check-valve 38, and a portion of said escaping air passes through said check-valve into the chamber 36 and acts upon the piston 37, tending to force the same toward the right, as shown in the drawings. The chamber 36 at the right-hand side of the piston 37 has an opening 39 to the atmosphere to permit air at the right of the piston to escape, so that the pressure acting on the left-hand side of the piston is effective to move the said piston toward the right. The stem 40 of said piston acts upon the valve 27, controlling communication from the passage 29, connected with the auxiliary reservoir, to the passage 30, leading through the check-valve 28 to the brake-cylinder. The valve 27 is a supplementary valve for admitting air to the brake-cylinder from the auxiliary reservoir in emergency applications of the brakes more copiously than it would be admitted through the regular service-valve 7 and passage 8, and in accordance with the present invention the escaping train-pipe air when the train-pipe is vented for emergency application of the brakes passes the check-valve 38 and acts upon the piston 37 to open the emergency brake-cylinder supply-valve 27 to permit the brake-cylinder to be charged quickly from the auxiliary reservoir. The depletion of the train-pipe when thus vented is very rapid, and the escape of said train-pipe air through the vent-passage 11 is a mere puff of short duration; but the check-valve 38, which is opened by the puff of escaping train-pipe air, a portion of which thus enters the chamber 36, is closed by the back pressure in the chamber 36 as the pressure of escaping train-pipe air falls to the atmospheric pressure, and thus the air is entrapped in the chamber 36 with sufficient pressure to retain the piston 37 at the right-hand end of its stroke and with the brake-cylinder supply-valve 27 open long enough for the air to flow from the auxiliary reservoir through the valve 27 into the brake-cylinder until the pressures therein substantially equalize, this being done in a very short interval of time, although the temporary action of the escaping train-pipe air if unconfined by the check-valve would not retain the valve 27 open long enough to fully charge the brake-cylinder. The volume of air in the chamber 36 between the piston 37 and the check-valve 38 is so small that it will escape quickly by the inevitable leakage past the piston 37, which is, however, shown as provided with a small passage 41 to indicate provision for such leakage or slow escape of the air through it and to the atmosphere through the vent-passage 39. Thus the pressure of the spring 31 on the valve 27 will close the latter very shortly after it has been opened, but not until the auxiliary-reservoir air has passed through said valve sufficiently to equalize substantially with the pressure in the brake-cylinder, and thus apply the brake with the maximum force attainable, this having been accomplished in a small fraction of a second. Thus directly after they have done their work the emergency brake-cylinder supply-valve 27 and parts associated therewith are automatically restored to normal condition ready for the next emergency operation of the brakes, the said parts being unaffected in the operation of releasing the brakes and in making the ordinary service applications of the brakes, in which the train-pipe is not vented except under control of the engineer by the engineer's valve provided for that purpose.

The check-valve 38 is connected with a rod or stem 42, having a series of projecting fingers 43, which serve as a stop to limit the inward or opening movement of the check-valve without stopping the flow of air through the passage 35, controlled by the check-valve. The said stem 42 works in a guide-passage in a cap-nut 44, having a vent-passage 45 to the atmosphere, this construction contributing to the guidance of the check-valve and also diminishing its effective area exposed to the escaping train-pipe air as compared with the area exposed to the air that has passed into the chamber 36, so that said check-valve is promptly closed as the train-pipe air falls below the pressure of the air that has passed into the chamber 36.

So far as the means for controlling the emergency brake-cylinder supply-valve forming the subject of this invention are concerned the construction of the appliances for operating the train-pipe vent-valve is immaterial, and it is also immaterial whether or not the said emergency brake-cylinder supply-valve and the train-pipe vent-valve are mechanically associated with the triple valve proper, which controls the brakes in the ordinary service or graduated applications thereof.

I claim—

1. The combination with the train-pipe, auxiliary reservoir, and brake-cylinder of an air-brake apparatus; of a train-pipe vent-valve for permitting air to escape from the train-pipe; a brake-cylinder supply-duct from the auxiliary reservoir to the brake-cylinder and valve controlling said duct; means actuated by the air escaping from the train-pipe when vented for actuating the valve in the brake-cylinder supply-duct; and means for entrapping a portion of said escaping train-pipe air, whereby the valve in the brake-cylinder supply-duct is retained open after the flow of air from train-pipe has ceased, substantially as and for the purpose described.

2. The combination with the train-pipe, auxiliary reservoir, and brake-cylinder of an air-brake apparatus; of a train-pipe vent-valve and passage for permitting air to escape from the train-pipe; a brake-cylinder supply-duct from the auxiliary to the brake-cylinder and valve controlling said duct; an actuating-piston for said valve and piston-chamber therefor; and a passage and check-valve controlling communication between said chamber and train-pipe vent-passage, substantially as and for the purpose described.

3. The combination with the train-pipe, auxiliary reservoir, and brake-cylinder of an air-brake apparatus, and an emergency supply-duct from the auxiliary reservoir to the brake-cylinder and valve controlling the same; a train-pipe discharge-duct and vent-valve controlling communication thereto from the train-pipe; an actuating-piston for the emergency brake-cylinder supply-valve and piston-chamber therefor, and a duct connecting said chamber with the train-pipe discharge-duct; a check-valve in said connecting-duct having a greater effective area exposed to the air which has passed the same into the piston-chamber than that exposed to the pressure of the escaping train-pipe air substantially as and for the purpose described.

In testimony whereof I have signed my name to this specification in the presence of two subscribing witnesses.

CHARLES W. VALENTINE.

Witnesses:
   JNO. F. MALONEY,
   R. HOLDEN.